United States Patent

[11] 3,599,111

[72] Inventors Luther C. Butler, Jr.
Garden Grove;
Thomas W. Grasmehr, Costa Mesa, Calif.;
Robert S. Jamieson
[21] Appl. No 8,770
[22] Filed Feb. 5, 1970
[45] Patented Aug. 10, 1971
[73] Assignee Lorain Products Corporation
Lorain, Ohio

[54] CRYSTAL-OSCILLATOR-CONTROLLED SIGNAL-GENERATING CIRCUIT
23 Claims, 4 Drawing Figs.

[52] U.S. Cl. .......... 331/55, 331/10, 331/49, 331/56
[51] Int. Cl. .......... H03b 3/00
[50] Field of Search .......... 331/55, 56, 49, 10, 14

*Primary Examiner*—John Kominski
*Attorney*—John Howard Smith

ABSTRACT: A highly reliable signal-generating circuit for providing, at an output, a plurality of phase-coordinated trains of pulses of high-frequency stability despite circuit failures within the signal-generating circuitry. A pair of crystal oscillators cause respective counter circuits to produce responsive sets of synchronism control pulses for regulating the frequency of a plurality of relaxation oscillator circuits. A clock selector circuit samples the output of the relaxation oscillators and, in accordance therewith, determines which counter circuit shall be utilized to supply synchronism control pulses to the relaxation oscillators. Corrective circuitry brings the non-selected counter circuit into synchronism with the selected counter circuit so that the former may be substituted for the latter if the latter fails to properly control the relaxation oscillator circuits. Phase control circuitry assures that necessary corrective activity occurs at times when such activity will not cause transient changes in the frequency of output pulses. Circuitry is provided to suppress the outputs of both counter circuits upon the occurrence of predetermined circuit failures. Under the latter conditions the output is maintained on an emergency basis by the relaxation oscillators.

INVENTOR.
THOMAS W. GRASMEHR
LUTHER C. BUTLER, JR.
ROBERT S. JAMIESON
BY John Howard Smith

PATENTED AUG 10 1971 3,599,111

SHEET 2 OF 3

INVENTOR.

THOMAS W. GRASMEHR
LUTHER C. BUTLER, JR.
ROBERT S. JAMIESON

BY John Howard Smith

INVENTOR.

THOMAS W. GRASMEHR
LUTHER C. BUTLER, JR.
ROBERT S. JAMIESON

BY John Howard Smith

CRYSTAL-OSCILLATOR-CONTROLLED SIGNAL-GENERATING CIRCUIT

BACKGROUND OF THE INVENTION

The present invention relates to switching circuits and is directed more particularly to a switching circuit for accurately controlling the frequency of pulses produced by a plurality of relaxation oscillator circuits.

In those pulse-generating circuits which control the frequency of operation of an electrical system, an important consideration is consistency in the lapse of time between control pulses. Failure to maintain such consistency will result in fluctuations in the frequency of operation of a circuit. Such fluctuations can have undesirable effects upon the electrical characteristics of circuits, especially those designed to operate at a predetermined precise frequency.

In a ferroresonant regulator circuit, for example, the level of the regulated output voltage varies with frequency for a given AC input voltage and a given load current. It is apparent, therefore, that an inverter circuit utilized to energize a load having critical voltage regulation requirements through a ferroresonant voltage regulator must operate at a closely controlled frequency. This, in turn, requires accurate control of the lapse of time between those pulses which initiate the successive half-cycles of the desired AC waveform in the inverter power circuitry. Because crystal oscillators can produce oscillations of the required high accuracy and stability, oscillators of this type are well suited to control the frequency of inverter circuits having ferroresonant regulated output voltages.

While the above-described type of crystal controlled inverter circuits will operate satisfactorily when used in electrical systems having ordinary reliability requirements, these circuits are unsatisfactory for use in electrical systems requiring extreme reliability such as, for example, those requiring a mean-time-between-failure on the order of 100,000 hours. One electrical system requiring such extreme reliability is the power circuitry (including an inverter) utilized to energize computers on a continuous basis despite interruptions in commercial line power. The failure of power circuitry of the above type can not only cause serious damage to computer circuitry but also interrupt the flow of vital information from a computer which operates on a real time basis.

One desirable method of attaining a high degree of circuit reliability is to design each circuit in the system in a manner such that the output of the system will be substantially unaffected by the failure of any single electrical component or circuit within the system. While this approach does, in itself, assure high reliability, a further degree of reliability can be achieved by providing, in addition, the ability to repair that single failure before a second failure occurs. Since the probability of a second failure occurring within the time necessary to repair the first failure is very small, it will be seen that the occurrence of those simultaneous multiple failures required to interrupt the output of the system can be made extremely improbable.

In view of the foregoing, it is apparent that a highly reliable inverter system having high frequency stability should include a crystal oscillator controlled circuit for producing inverter control pulses, this circuit being adapted to continue to produce the desired inverter control pulses despite failures therewithin. Prior to the present invention this has been a problem.

SUMMARY OF THE INVENTION

Accordingly, it is an object of the invention to provide a highly reliable signal-generating circuit having high frequency stability.

It is another object of the invention to provide first and second crystal-oscillator-controlled synchronizing-pulse-generating circuits each adapted to provide the synchronism control pulses necessary for controlling the frequency of and maintaining an inphase relationship between the pulses produced by a plurality of relaxation oscillators.

Still another object of the invention is to provide selector circuitry for connecting one or the other of the synchronizing-pulse-generating circuits in energizing relationship to he relaxation oscillators, the nonselected synchronizing-pulse-generating circuit being kept in a state of readiness to take the place of the selected synchronizing-pulse-generating circuit if the latter is found to be out of synchronism with a majority of the output pulses from the relaxation oscillators.

It is an object of the invention to provide synchronism control circuitry adapted to periodically lower the nature frequency of operation of a plurality of relaxation oscillators thereby causing the latter to operate under the control of the then selected synchronizing-pulse-generating circuit rather than at their own natural frequencies.

Yet another object of the invention is to provide circuitry adapted to inhibit the selection of either synchronizing-pulse-generating circuit if the selector circuitry attempts to utilize both of the latter in controlling the relaxation oscillators.

Another object of the invention is to provide a signal-generating circuit including a plurality of relaxation oscillators which are normally under the control of one or the other of two crystal-oscillator-controlled synchronizing-pulse-generating circuits, the relaxation oscillators being adapted to maintain signal-generating activity on an emergency basis in the event that a circuit failure renders both synchronizing-pulse-generating circuits unfit to maintain control over the relaxation oscillators.

It is another object of the invention to provide circuitry whereby the selected synchronizing circuit may control the phase relationship between the outputs of the relaxation oscillators and the synchronism control pulses produced by the nonselected synchronizing-pulse-generating circuit, thus preventing transient changes in the output frequency of the relaxation oscillators when the nonselected synchronizing-pulse-generating circuit is substituted for the previously selected synchronizing-pulse-generating circuit.

Still another object of the invention is to provide circuitry whereby a synchronizing-pulse-generating circuit may be brought into phase with the relaxation oscillator circuits which it controls.

DESCRIPTION OF THE INVENTION

The circuit of the present embodiment utilizes positive logic, that is logic wherein binary 1 or the high state is represented by a positive voltage and binary 0 or the low state is represented by zero volts. Thus, when the signal at a given point is said to be high, it is meant that a positive voltage appears between a common reference and that point. Similarly, when the signal at a given point is said to be low, it is meant that that point is at the potential of the common reference.

Figure 3:
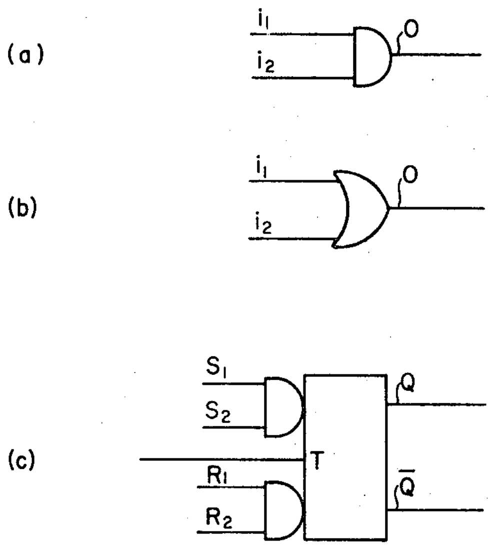
FIG. 3 illustrates logical symbols utilized in FIGS. 1 and 2.

An example of a first type of logic symbol is the NAND gate shown in FIG. 3*a*. This gate has first and second inputs *i1* and *i2* and an output 0. The output of this gate is low only if both inputs are high. FIG. 3*b* illustrates a NOR gate. The output of this circuit is high if any one or more inputs are low. These statements will be understood to apply to gates of either type having more or less than two inputs.

An example of a third type of logic symbol is the flip-flop shown in FIG. 3*c*. This flip-flop has a pair of clocked set inputs $s_1$ and $s_2$, a pair of clocked reset inputs, $R_1$ and $R_2$, a clock or toggle input T, and first and second outputs Q and $\overline{Q}$. Q and $\overline{Q}$ are at all times in opposite logical states. When this flip-flop is operating in its clocked mode, output Q goes high (the flip-flop is set) when the signals at inputs $S_1$ and $S_2$ are both high at the time that a high-to-low transition occurs in the signal appearing at the toggle input T. Similarly, output $\overline{Q}$ goes high (the flip-flop is reset) when inputs $R_1$ and $R_2$ are both high at the time that a high-to-low transition occurs in the signal appearing at toggle input T. It will be understood that the logic symbols shown herein are used in the usual sense in that the representation thereof implies the standard power connections thereto.

It sometimes happens that a flip-flop has more inputs than are actually needed. Under these conditions the unused inputs must be kept high so that the remaining inputs may control the state of the output. In diode-transistor-logic (DTL) circuits of the type contemplated for use herein, this may be accomplished by leaving the unused inputs unconnected.

Figure 1:
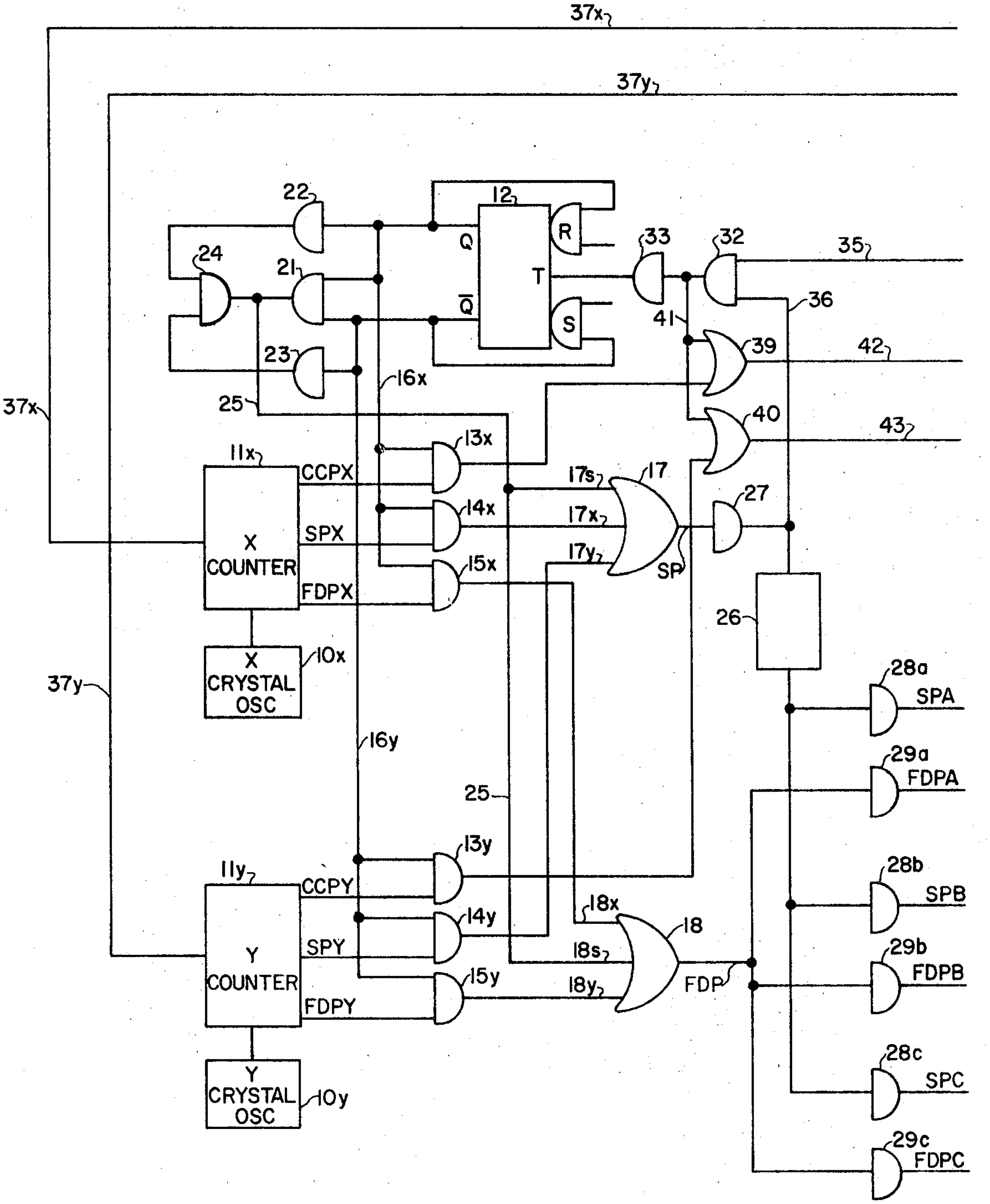
FIGS. 1 and 2 are logic diagrams of connected sections of a single circuit embodying the invention.

Referring to FIG. 1 there are shown first and second crystal oscillators 10*x* and 10*y*. These oscillator circuits, together with respective counters 11*x* and 11*y*, to be described presently, comprise synchronizing-pulse-generating circuits which normally provide the synchronism control pulses that establish the frequency of the signals generated by the circuitry of FIGS. 1 and 2. While crystal oscillators 10*x* and 10*y* are each adapted to initiate pulses suitable for controlling the circuitry of FIGS. 1 and 2, these oscillators operate severally in that only one is selected to exercise this control at any given time. The nonselected oscillator is arranged to assume a state of readiness to assert control if the pulses initiated by the selected crystal oscillator provide unsatisfactory. Because crystal oscillators of the type contemplated for use herein are well-known commercially available items, this portion of the circuit is shown in block form only.

To the end that the high frequency pulses produced by crystal oscillators 10*x* and 10*y* may be utilized to generate pulses of a frequency suitable for controlling inverter circuits, there are provided counter circuits 11*x* and 11*y*, respectively, of the frequency reducing or countdown type. These counter circuits may be of the well-known type which include chains of flip-flops each of which changes its state at one-half of the frequency of the preceding flip-flop, the first flip-flop changing its state in response to successive pulses from a master pulse source or clock. In a specific advantageous embodiment, for example, pulses of a 360-pulse-per-second repetition rate may be produced at the counter circuit outputs by dividing the 1,152,000 pulse per second repetition rate of a crystal oscillator by 5, then by dividing again by 128 ($2^7$) and finally by dividing once more by five. In other words the counter circuit produces one pulse at its output for each $5\times128\times5$ pulses from the crystal oscillator. Flip-flop circuits adapted to accomplish the above reductions are well known to those skilled in the art.

Figure 4:
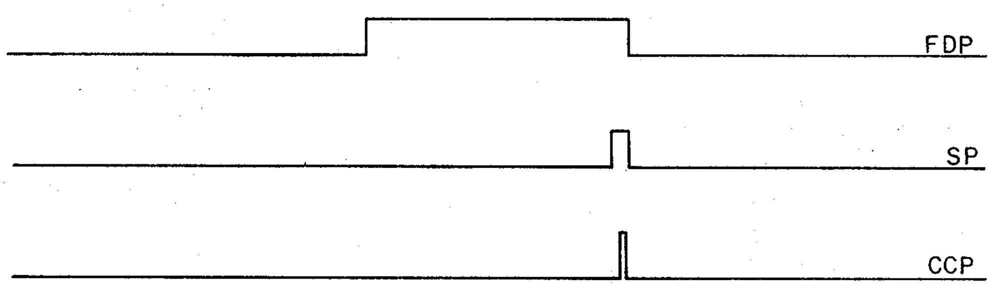
FIG. 4 shows the phase relationships between control pulses generated by the circuitry of FIG. 1.

Counter circuit 11*x* desirably produces three types of pulses: CCPX, SPX and FDPX. These pulses all occur at a 360-pulse-per-second repetition rate but have different durations. As shown in FIG. 4, FDPX is a frequency-depressing pulse and has the longest duration. SPX is a synchronizing pulse and occurs within FDPX. CCPX is a counter correction pulse and occurs within SPX. Similarly, counter circuit 11*y* produces three types of pulses: CCPY, SPY and FDPY. The functions of each of these pulses will be described in detail later.

The above-described set of pulses of a 360-pulse-per-second repetition rate may be derived from the plurality of square waves which are generated during the above-described process of frequency division. This may be accomplished by gating the lowest frequency square wave with appropriate ones of the higher frequency square waves generated in the process of pulse frequency division.

Figure 2:
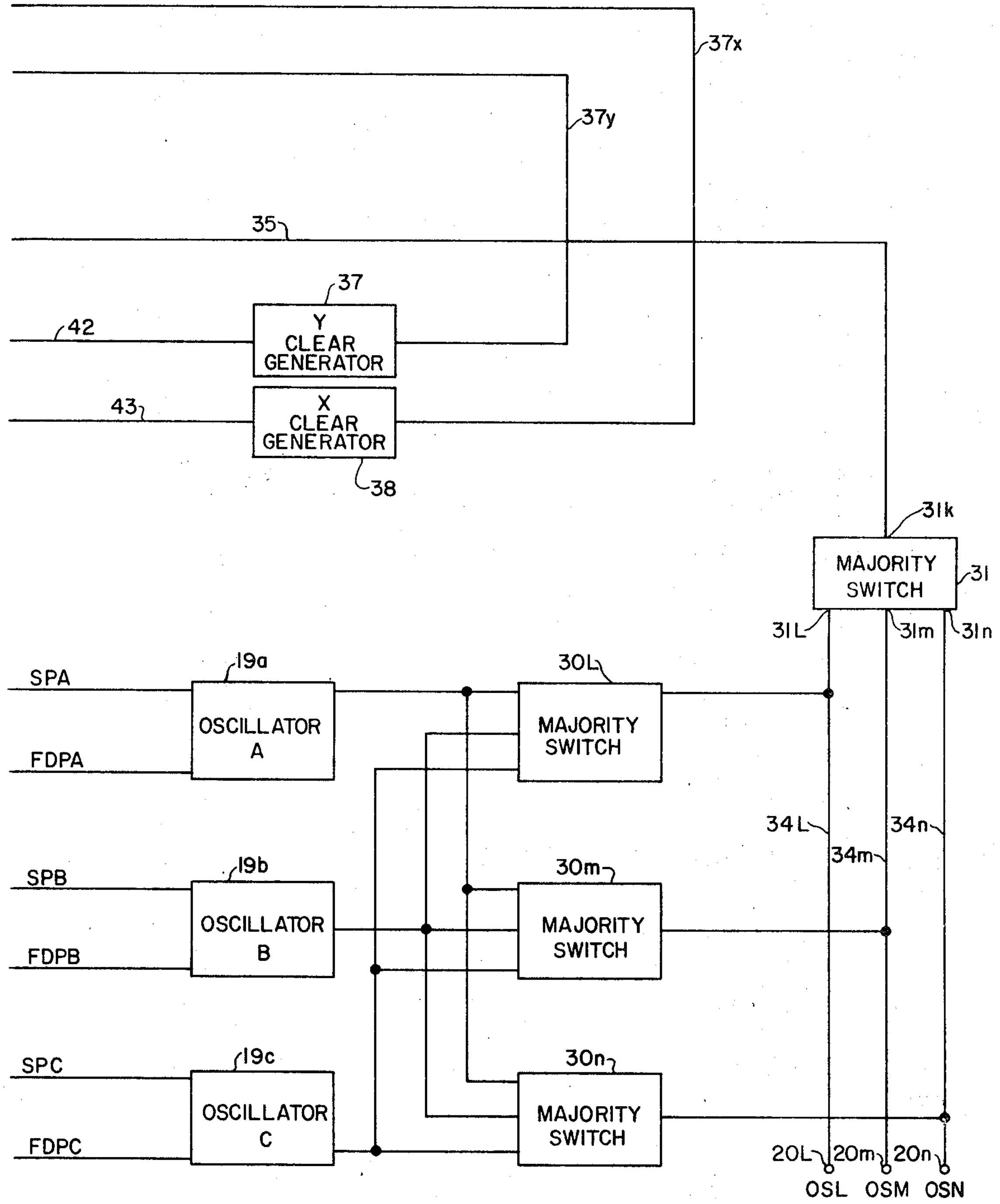

To the end that the sets of control pulses produced by either counter 11*x* or counter 11*v* may be utilized to control the frequency of the output-signal-generating circuitry of FIG. 2, there is provided a two-state switching circuit 12 which here also takes the form of a flip-flop. When flip-flop 12 is in a first or set state, that is, when its Q output is high, pulses CCPX, SPX and FDPX from counter 11*x* are able to control (render low) the outputs of pulse control means 13*x*, 14*x* and 15*x*, respectively. This is because the Q output of flip-flop 12 is connected in enabling relationship to gates 13*x*, 14*x* and 15*x* through a conductor 16*x*. Since the outputs of a flip-flop must be in opposite logical states, the $\overline{Q}$ output of flip-flop 12 is at this time low. As a result, pulses CCPY, SPY and FDPY are unable to control (render low) the outputs of gates 13*y*, 14*y* and 15*y*. This is because the $\overline{Q}$ output of flip-flop 12 is connected in disabling relationship to gates 13*y*, 14*y* and 15*y* through a conductor 16*y*.

From the foregoing, it will be seen that when two-state switch means 12 is in a first state the pulses produced by the synchronizing circuit including clock 10*x* and counter 11*x* can, by changing the states of the outputs of pulse control means 13*x*, 14*x* and 15*x*, affect the operation of the circuitry of FIGS. 1 and 2 beyond the outputs of gates 13*x*, 14*x* and 15*x* but the pulses produced by the synchronizing circuit including clock 10*y* and counter 11*y* are prevented from having any effect beyond gates 13*y*, 14*y* and 15*y*. These conditions define the selection of counter 11*x*.

Similarly, when flip-flop 12 is in a second or reset state, pulses CCPY, SPY and FDPY control the states of the outputs of gates 13*y*, 14*y* and 15*y*, respectively, while pulses CCPX, SPX and FDPX are unable to control the states of the outputs of gates 13*x*, 14*x* and 15*x*, respectively. These conditions define the selection of counter circuit 11*y*.

To the end that synchronizing pulses may be supplied to the pulse generating circuitry of FIG. 2 when either counter 11*x* or counter 11*y* has been selected by flip-flop 12, there is provided OR circuit means here shown as a NOR gate 17 having a suppress or disable input 17*s* and signal inputs 17*x* and 17*y*. The latter inputs are connected to the outputs of synchronizing pulse control gates 14*x* and 14*y*, respectively. These connections enable the state of the output of either gate 14*x* or gate 14*y* to control the state of the output of gate 17. If, for example, flip-flop 12 is set, that is, if counter 11*x* has been selected to control the signal generating circuitry of FIG. 2, the output of gate 14*x* will go low each time counter circuit 11*x* produces an SPX pulse. Under these conditions the output of gate 14*y* will remain high because the $\overline{Q}$ output of flip-flop 12 is connected in disabling relationship thereto. If, under these conditions, input 17*s* is high (indicating that flip-flop 12 is operating normally), the output of gate 17 will go high when and for so long as the SPX pulse from counter 11*x* is high.

If, on the other hand, flip-flop 12 is reset, that is, if counter 11*y* has been selected to control the pulse-generating circuitry of FIG. 2, the output of gate 14*y* will go low each time counter 11*y* produces an SPY pulse. Under these conditions the output of gate 14*x* will remain high because the Q output of flip-flop 12 is connected in disabling relationship thereto. If, under these conditions, input 17*s* is high (again indicating that flip-flop 12 is operating normally), it will be seen that the output of gate 17 will go high when and for so long as the SPY pulse from counter 11*y* is high.

In view of the foregoing, it is apparent that high state synchronizing pulses appear at the output of gate 17 so long as either counter 11*x* or counter 11*y* has been selected by flip-flop 12. Thus, flip-flop 12 together with gates 14*x* and 14*y* and gate 17 comprise a two-state selector circuit for determining which of the counters will produce the desired synchronizing pulses at the output of gate 17. This selector circuit allows one counter and its respective crystal oscillator to provide the required synchronizing pulses while the remaining counter and its crystal oscillator stand ready to substitute themselves therefor in the event that the operation of the selected counter fails to operate properly.

If, for example, one of the flip-flops of counter 11*x* should fail in such a way that it ceases to change states, the frequency and duration of the pulses produced by counter 11*x* would be altered. Without circuitry adapted to prevent these distorted outputs from exerting control over the circuitry of FIG. 2, it is apparent that a failure of this type could be reflected in the operation of the circuitry energized by the circuitry of FIGS. 1 and 2. The ability of the above-described selector circuitry to use control pulses from a second nonfailed counter prevents this from occurring.

Similarly, flip-flop 12, gates 15$x$ and 15$y$ and a gate 18 comprise a two-state selector circuit for determining which of the counters 11$x$ or 11$y$ will cause the appearance of FDP pulses at the output of gate 18. It will be understood that the counter which is selected by flip-flop 12 will be understood that the counter which is selected by flip-flop 12 will initiate both the synchronizing pulses at the output of gate 17 and the frequency depressing pulses at the output of gate 18. As will be seen presently, the SP and FDP pulses initiated by the selected counter act together to control the generation of pulses by relaxation oscillator circuits 19$a$, 19$b$ and 19$c$ of FIG. 2, these oscillators, in turn, controlling the appearance of output signals OSL, OSM and OSN at output terminals 20L, 20M and 20N.

The attributes of the SP and FDP pulses of the type shown in FIG. 4 and their contribution to a fail-safe system will now be described. In achieving the fail-safe operation of a chain or cascade of electrical circuits, it is necessary that the output continue despite any single failure anywhere in the chain. The circuit of FIG. 1 is adapted to serve as the first circuit of any suitable chain of circuits which, taken as a whole, comprise a fail-safe system for generating a plurality of pulse trains. Thus, the circuit of FIG. 1 must be highly reliable and in addition must be, as will be seen presently, adapted to contribute to the failsafe character of a system in which the crystal clock control of the present invention is utilized.

Accordingly, if the system is to be of the desired uninterruptible nature, output signals OSL, OSM and OSN must appear at output terminals 20L, 20M and 20N, respectively, of FIG. 2, even if the circuit of FIG. 1 is not operating properly. In the present embodiment this in achieved by providing synchronism control circuitry and oscillator circuitry which are adapted to operate in two modes.

In a first mode, oscillator circuits 19$a$, 19$b$ and 19$c$ generate pulses under the control of synchronism control pulses from the circuitry of FIG. 1. In a second, or emergency mode oscillators 19$a$, 19$b$ and 19$c$ free-run at their natural frequencies, the natural frequencies being substantially equal to the frequency produced when these oscillators operate in the first mode. Thus, in the event of the interruption of synchronism control pulses from FIG. 1, oscillators 19$a$, 19$b$ and 19$c$ will begin to produce pulses at their natural frequencies to maintain outputs OSL, OSM and OSN.

In order to control oscillators which tend to operate at their own natural frequency will externally initiated synchronizing pulses of substantially the same frequency, it is necessary to prepare the oscillators for submission to external control by momentarily depressing the natural frequencies thereof. This depressing causes the oscillators to submit to control by the synchronizing-pulse-generating circuitry because, at the depressed natural frequency, the inherent pulse-generating activity of the oscillators never has a chance to occur, control by higher frequency crystal-oscillator-controlled synchronizing pulses occurring first and therefore dominating. This frequency depression may be accomplished by the application of frequency depressing pulses FDP which momentarily depress or reduce the natural frequencies of oscillators 19$a$, 19$b$ and 19$c$ before each synchronizing pulse. A suitable oscillator utilizing this type of frequency depression is described in the copending application of Paul E. Rolfes and Robert S. Jamieson, Ser. No. 885,898, entitled Oscillator Synchronization. It will be seen, therefore, that the provision of both SP and FDP pulses contributes to the reliability of the signal generating activity of FIGS. 1 and 2.

To the end that the outputs of gates 17 and 18 may be prevented from changing states if flip-flop 12 should attempt to simultaneously select or reject both counter 11$x$ and counter 11$y$, there are provided gates 21, 22, 23 and 24. If flip-flop 12 should attempt to utilize pulses from both counter 11$x$ and counter 11$y$, that is, if both Q and $\overline{Q}$ of flip-flop 12 are high, the output of gate 21 will go low. This low is applied to gates 17 and 18 through conductor 25 to prevent SP and FDP pulses from appearing at the outputs of gates 17 and 18, respectively. As a result, the adverse affects of Q and $\overline{Q}$ being high simultaneously will not disrupt the operation of the circuit of FIG. 2. Under these conditions the oscillator circuits of FIG. 2 will, by operation in their free- running mode, maintain outputs OSL, OSM and OSN until the circuit of FIG. 1 can be repaired.

If, on the other hand, flip-flop 12 should attempt to utilize pulses from neither counter circuit, that is, if both Q and $\overline{Q}$ are low, the outputs of gates 22 and 23 will go high thereby causing the output of gate 24 to go low. This also prevents SP and FDP pulses from appearing at the outputs of gates 17 and 18, respectively.

To the end that synchronizing pulses appearing at the output of gate 17 may be utilized to control oscillator circuits 19$a$, 19$b$ and 19$c$ of FIG. 2, an AC coupling circuit 26, a logical state reversing or inverting gate 27 and buffer gates 28$a$, 28$b$ and 28$c$ are provided. Coupling circuit 26 prevents the failure of circuit elements such as gate 17 from injecting a DC level into and thereby disrupting normal operation of gates 28$a$, 28$b$ and 28$c$.

Gates 28$a$, 28$b$ and 28$c$ split the pulses appearing at the output of coupling circuit 26 into three separate synchronizing pulses being applied in control relationship to respective oscillators. Gate 27 compensates for the logical state reversal introduced by gates 28$a$, 28$b$ and 28$c$. Thus, synchronizing pulses having crystal-oscillator-controlled repetition rates, appear at the inputs of respective oscillator circuits of fig. 2 when the circuitry of FIG. 1 is operating in the proper manner.

To the end that frequency depressing pulses appearing at the output of gate 18 may be utilized to reduce the frequency of operation of oscillator circuits 19$a$, 19$b$ and 19$c$ of FIG. 2 and thereby allow synchronizing pulses SPA, SPB and SPC, respectively, to assume control thereof, there are provided buffer gates 29$a$, 29$b$ and 29$c$. These gates split the frequency depressing pulses appearing at the output gate 18 into three separate but in-phase pulses FDPA, FDPB and FDPC, these pulses being applied in frequency-reducing relationship to respective oscillator circuits in FIG. 2.

As described previously, it is desirable that output signals OSL, OSM and OSN appear at output terminals 20L, 20M and 20N, respectively, despite the failure of circuit elements of FIGS. 1 and 2. To this end the outputs of oscillator circuits 19$a$, 19$b$ and 19$c$ are connected to output terminals 20L, 20M and 20N, respectively, through majority responsive switching circuits 30L, 30M and 30N. Each of the latter circuits is connected to the output of each oscillator circuit and provides an output pulse to the respective output terminal when a majority of the inputs thereto are energized. Majority switching circuit 30L, for example, will cause an OSL pulse to appear at output terminal 20L if (1) oscillator 19$a$ produces an output pulse at the same time as oscillator 19$b$, (2) oscillator 19$a$ produces an output pulse at the same time as oscillator 19$c$ or (3) oscillator 19$b$ produces an output pulse at the same time as oscillator 19$c$. Thus, output OSL will continue even if the supply of output pulses from any one relaxation oscillator is interrupted. Circuitry suitable for maintaining a synchronized relationship between oscillators 19$a$, 19$b$ and 19$c$ when no synchronizing pulses are present is described in the copending application of Thomas W. Grasmehr, Luther C. Bulter and Robert S. Jamieson, Ser, No. 8,877, entitled Multi-Channel Control Circuit.

To the end that flip-flop 12 may change states to select the standby counter if the SP and FDP pulses from the selected counter are out of phase with output signals OSL, OSM and OSN, phase error detecting means including majority responsive switching circuit 31, phase responsive switching means 32 and a logical state reversing means 33 are provided. Majority circuit 31 has the same function as majority circuits 30L, 30M and 30N and provides a high at its output 31K when highs are present at a majority of its inputs 31L, 31M and 31N. Since inputs 31L, 31M and 31N are connected to respective output terminals 20L, 20M and 20N through conductors 34L, 34M and 34N, respectively, it is apparent that the state of output 31K of majority circuit 31 is representative of the time at which outputs OSL, OSM and OSN occur.

The comparison between the time of occurrence of synchronizing pulse SP and the time of occurrence of output signals OSL, OSM and OSN, upon which the decision of the circuitry to select the standby counter is based, is accomplished by gate 32. To this end one input of gate 32 is connected in sensing relationship to the outputs of oscillators 19*a*, 19*b* and 19*c* through majority circuit 31 and a conductor 35 and the other input is connected in sensing relationship to the output of NOR gate 17 through logical state reversing gate 27 and a conductor 36. The latter connections enable gate 32 to sample the control inputs to and signal outputs from oscillators 19*a*, 19*b* and 19*c*. Because the output of gate 32 will go low (thereby beginning the process which culminates in a reversal in the state of flip-flop 12) only if both inputs thereto are high, and because the output of gate 27 is low during each SP pulse, it is apparent that the state of the output of gate 32 will not go low if output 31K is high only during an SP pulse. The latter conditions indicate that the output pulses appearing at terminals 20L, 20M and 20N occurs at substantially the same time as the SP pulse which initiated those outputs and, therefore, that the desired phase relationship exist. Thus, when the circuitry of FIGS. 1 and 2 is operating properly, the output of gate 32 remains high and no corrective activity is initiated.

If, however, the output 31K of majority circuit 31 should go high at a time other than during an SP pulse, both inputs to gate 32 will then be high. This indicates that an output is occurring either before or after the SP pulse which should initiate it, either condition indicating an error in phase. Under these circumstances, the output of gate 32 will go low and thereby cause the output of gate 33 to go high. Thereafter, when the output of majority circuit 31 goes low, indicating the end of output pulses OSL, OSM and OSN, a high-to-low transition will occur at the output of gate 33 which will change the state of flip-flop 12. Thus, when the output signals OSL, OSM and OSN are not substantially in phase with synchronizing pulses from the circuit of FIG. 1, the state of flip-flop 12 is reversed, this serving to select the SP and FDP pulses from the counter which was previously not selected.

In view of the foregoing, it will be seen that the nonselected counter is substituted for the previously selected counter if output pulses appear at terminals 20L, 20M and 20N at a time when no synchronizing pulse is present. This interchange of counters does not, under all circumstances, assure that the newly selected counter will be in phase with outputs OSL, OSM and OSN. This is because the flip-flops of the newly selected counter may be in logical states other than those which should exist if the newly selected counter were operating in phase with outputs OSL, OSM and OSN. To assure that the flip-flops withing the newly selected counter may begin their counting activity at a time when these flip-flops are in correct logical state, it is desirable that the flip-flops of the newly selected counter be cleared (reset) at the end of output pulses OSL, OSM and OSN. This time for clearing is desirable because it is the time when the flip-flops should begin a new cycle of the switching activity which culminates in the production of the next synchronizing pulse and, therefore, the next set of output pulses at terminals 20L, 20M and 20N. Consequently, the end of output pulses OSL, OSM and OSN is the time when all flip-flops should be in the states appropriate to the beginning of a new counting cycle, namely, their reset states.

Because the above described clearing of the counters occurs when the previous set of output pulses terminates, and because 5×128×5 accurately timed pulses from crystal oscillators 10*x* and 10*y* must occur before the cleared counter can initiate another set of synchronism control pulses, it is apparent that the interval between the set of output pulses preceding the clearing activity and that following the clearing activity is of precisely the desired duration. Thus, by causing clearing to occur at the end of a set of output pulses, the clearing of the counters occurs at a time when this activity will not disrupt the frequency of the desired output pulses. In this manner the conditions of the counter circuits are brought into agreement with the conditions existing at output terminals rather than vice versa. The advantage in the former manner of assuring the proper phase relationship is that, with the former, no transient changes in the repetition rate of pulses appearing at output terminals 20L, 20M and 20N occur as a result of necessary activity.

To the end that the foregoing corrective activity may be accomplished, clear-pulse-generating circuits 37 and 38 and NOR circuits 39 and 40 are provided. Clear-pulse-generating circuit 37 is adapted to produce a pulse of amplitude and duration sufficient to reset all flip-flops in counter 11*y* each time there occurs a high-to-low transition in the voltage at the input thereto. This clear pulse is applied to counter 11*y* through a conductor 37*y*. Since the output of phase responsive gate 32 is connected to clear circuit 37 through a conductor 41, NOR gate 39 and conductor 42, it will be seen that the above high-to-low transition can occur only when output pulses OSL, OSM and OSN terminate and only then if the latter occurs when no synchronizing pulse is present. As previously described, the above conditions indicate that a phase error has occurred and that the time for correction has arrived. Similarly, clear circuit 38 applies a clear pulse to counter 11*x*, through a conductor 37*x*, each time the phase responsive gate 32 energizes the clear circuit 38 through conductor 41, and 40, and a conductor 43. Thus, each time a phase error occurs, clear pulses are applied to counters 11*y* and 11*x* by clear circuits 37 and 38, respectively.

To the end that the nonselected counter may at all times be ready to take the place of the selected counter, should such substitution be necessary, each CCP pulse from the selected counter is applied in energizing relationship to the clear circuit which provides clear pulses to the nonselected counter. If, for example, counter 11*x* has been selected, that is, has been allowed to assume control over gates 17 and 18, the output of gate 13*x* will go low each time a CCPX pulse occurs. This will, in turn, cause a high to appear at the output of NOR gate 39. Thereafter, when the CCPX pulse terminates, the output of gate 13*x* will return to its high state and cause the output NOR gate 39 to undergo a high-to-low transition. The latter condition will initiate generation of a clear pulse by clear circuit 37 which will reset the flip-flops of counter 11*y*. Similarly, if counter 11*y* has been selected, each CCPY pulse will initiate the clearing of the nonselected counter 11*x* through NOR gate 40. In this manner, the nonselected counter is kept ready to replace the selected counter.

From the foregoing, it will be seen that the clear-pulse-generating activity of clear circuit 37 is initiated through NOR gate 39 whether gate 39 is energized as a result of the above described phase comparison activity of gate 32 or as a result of the action of CCPX pulses upon gate 13*x*. This alternative control over clear circuit 37 contributes to the maintenance of properly phase-synchronizing pulses in the event of a circuit failure. This is because the interruption of either of the alternative types of control over clear circuit 37, as a result of a circuit failure, does not cause clear circuit 37 to cease functioning. Similarly, NOR gate 40 allows alternative control over clear circuit 38.

Because the circuitry of FIGS. 1 and 2 is adapted to produce outputs of highly accurate frequency OSL, OSM and OSN under the control of either of two crystal oscillator controlled sources of synchronism control pulses (counter 11*x* or 11*y*) and because the latter sources can be substituted for one another to maintain the desired output, it will be seen that the frequency of the above output can be accurately controlled despite the failure of either source. In addition, because the sources 11*x* and 11*y* are subject to the corrective activity (by the action of gates 13*x* and 13*y*and gate 32) at times selected to coincide with outputs OSL, OSM and OSN, it will be seen that corrective action does not cause transient changes in the frequency of the desired output. Finally, because circuitry (gates 21, 22, 23 and 24) is provided to suppress the control activity of sources 11$x$ and 11$y$ upon the failure of the switching circuit (flip-flop 12) which selects the source to be used in controlling the output frequency, it will be seen that the effect of a failure of this type is localized. This prevents the disruption of the relaxation oscillator circuitry which can maintain a satisfactory output, on am emergency basis, in the absence of any control activity by sources 11$x$ and 11$y$. Thus, the circuitry of FIGS. 1 and 2 comprises a highly reliable pulse-generating circuit having a frequency stability comparable to that provided by crystal oscillators.

It will be understood that the embodiment shown herein is for explanatory purposes only and may be changed and modified without departing from the spirit and scope of the invention as set forth in the appended claims.

What we claim is:

1. In a signal generating circuit, in combination, first and second synchronizing-pulse-generating means for providing respective synchronizing pulses, oscillator means, two-state selector means for connecting said first synchronizing-pulse-generating means in control relationship to said oscillator means when said selector means is in a first state and for connecting said second synchronizing-pulse-generating means in control relationship to said oscillator means when said selector means is in a second state, phase-error-detecting means for comparing the pulses produced by said oscillator means with the pulses produced by the selected one said synchronizing pulse generating means and means for connecting said phase error detecting means in state controlling relationship to said two-state selector means when an out of phase relationship is detected by said error detecting means.

2. A signal-generating circuit as set forth in claim 1 in which each of said synchronizing-pulse-generating means includes crystal oscillator means, counter means, means for connecting said crystal oscillator means in pulse generation control relationship to said counter means.

3. A signal-generating circuit as set forth in claim 1 in which said two-state selector means includes two-state switching means, OR circuit means, first synchronizing pulse control means, means for connecting said first synchronizing pulse control means between said first synchronizing pulse generating means and said OR circuit means, said first synchronizing pulse control means being adapted to energize said OR circuit means each time a pulse is produced by said first synchronizing-pulse-generating means at a time when said two-state switching means is in a first of its two states, second synchronizing pulse control means, means for connecting said second synchronizing pulse control means between said second synchronizing-pulse-generating means and said OR circuit means, said second synchronizing pulse control means being adapted to energize said OR circuit means each time a pulse is produced by said second synchronizing-pulse-generating means at a time when said two-state switching means is in the second of its two states and means for connecting said OR circuit means in frequency control relationship to said oscillator means.

4. A signal-generating circuit as set forth in claim 3 in which said phase-error-detecting means includes phase responsive switching means having an output of said phase responsive switching means in state controlling relationship to said two-state switching means, means for connecting one input of said oscillator means, means for connecting the other input of said phase responsive switching means to the output of said OR circuit means to sense synchronizing pulses appearing thereat, said switching means being adapted to change the state of said two-state switching means if said output pulses do not occur during the time when synchronizing pulses are present at the output of said OR circuit means.

5. A signal-generating circuit as set forth in claim 3 including clearing means for bringing the synchronizing pulses generated by said synchronizing-pulse-generating means into phase with the pulses produced by said oscillator means, said clearing means including clear-pulse-generating means, means for connecting said phase-error-detecting means in pulse generation control relationship to said clear-pulse-generating means, means for connecting said clear-pulse-generating means in resetting relationship to said synchronizing-pulse-generating means.

6. A signal-generating circuit as set forth in claim 4 in which said means for connecting said one input of said phase responsive switching means in sensing relationship to said oscillator means includes majority responsive switching means having a plurality of inputs and an output, means for connecting the inputs of said majority responsive switching means to respective oscillator means and means for connecting the output of said majority responsive switching means to said one input of said phase responsive switching means.

7. A signal-generating circuit as set forth in claim 1 in which said phase-error-detecting means includes phase responsive switching means having an output and at least two inputs, means for connecting the output of said phase responsive switching means in state controlling relationship to said two-state selector means, means for connecting one input of said phase responsive switching means in sensing relationship to said oscillator means, means for connecting the other input of said phase responsive switching means in sensing relationship to the selected one of said synchronizing-pulse-generating means, said phase responsive switching means being adapted to change the state of said two-state selector means if there exists a difference in phase between the signals sensed at the inputs of said phase responsive switching means.

8. A signal-generating circuit as set forth in claim 7 in which said means for connecting said one input of said phase responsive switching means in sensing relationship to said oscillator means includes majority responsive switching means having a plurality of inputs and an output, means for connecting the inputs of said majority responsive switching means to respective oscillator means and means for connecting the output of said majority responsive switching means to said one input of said phase responsive switching means.

9. A signal-generating circuit as set forth in claim 1 including clearing means for bringing said synchronizing pulse generating means into phase with said oscillator means, said clearing means including clear-pulse-generating means, means for connecting said phase error detecting means in pulse generation control relationship to said clear-pulse-generating means, and means for connecting said clear-pulse-generating means in resetting relationship to said synchronizing-pulse-generating means.

10. In a signal-generating circuit, in combination, first and second synchronizing-pulse-generating means for establishing a succession of synchronizing pulses at respective outputs thereof, oscillator means having input means and output means, two-state selector means for connecting the output of said first synchronizing-pulse-generating means in frequency control relationship to the input means of said oscillator means when said two-state selector means is in a first state and for connecting the output of said second synchronizing-pulse-generating means in frequency control relationship to the input means of said oscillator means when said two-state selector means is in a second state, a plurality of output signal terminals, means for connecting the output means of said oscillator means to respective output signal terminals, phase-error-detecting means, means for connecting said phase-error-detecting means to the output means said oscillator means to sense the pulses produced thereat, means for connecting said phase error detecting means to said two-state selector means to sense the synchronizing pulses appearing thereat, and means for connecting said phase-error-detecting means in state controlling relationship to said two-state selector means, said phase-error-detecting means changing the state of said two-state selector means when an out of phase relationship is sensed by said phase-error-detecting means.

11. A signal-generating circuit as set forth in claim 10 in which said phase-error-detecting means includes phase responsive switching means having two inputs and an output, means for connecting the output of said phase responsive switching means in state controlling relationship to said two-state selector means, means for connecting one input of said phase responsive switching means to the outputs of said oscillator means to sense the output pulses appearing thereat, means for connecting the other input of said phase responsive switching means to said two-state selector means to sense the synchronizing pulses appearing thereat, said phase responsive switching means changing the state of said two-state selector means when the output pulses from said oscillator means occur at a time when no synchronizing pulses appear at said two-state selector means.

12. A signal-generating circuit as set forth in claim 11 in which said means for connecting one input of said phase responsive switching means to the outputs of said oscillator means includes majority responsive switching means having a plurality of inputs and an output, means for connecting the inputs of said majority responsive switching means to the outputs of respective oscillator means and means for connecting the output of said majority responsive switching means to said one input of said phase responsive switching means.

13. A signal-generating circuit as set forth in claim 11 including clearing means for bringing said synchronizing-pulse-generating means into phase with said oscillator means, said clearing means including clear-pulse-generating means, means for connecting the output of said phase-error-detecting means in clear-pulse-initiating relationship to said clear-pulse-generating means, means for connecting said clear-pulse-generating means in resetting relationship to said synchronizing-pulse-generating means.

14. A signal generating circuit as set forth in claim 10 in which said two-state selector means includes two-state switching means having an input and first and second outputs adapted to assume opposite logical states, OR circuit means having at least two inputs and an output, means for connecting the output of said OR circuit means to the inputs of said oscillator means, first and second AND circuit means each having at least two inputs and an output, means for connecting the outputs of said first and second AND circuit means to respective inputs of said OR circuit means, means for connecting one input from said first and second AND, circuit means to respective outputs of said two-state switching means, means for connecting another input from said first and second AND circuit means to the outputs of respective synchronizing pulse generating means.

15. The signal-generating circuit as set forth in claim 10 in which said two-state selector means includes a flip-flop having first and second outputs and an input, the states of the outputs of said flip-flop being adapted to undergo reversals each time there occurs a high-to-low transition in the logical state of the input thereof, and in which said phase-error-detecting means includes NAND circuit means having two inputs and an output, logical state reversing means for connecting the output of said NAND circuit means to the input of said flip-flop, means for connecting one input of said NAND circuit means to the outputs of said oscillator means to sense the pulses produced thereat, means for connecting the other input of said NAND circuit means to said two-state selector means to sense the synchronizing pulses appearing thereat, the output of said NAND circuit means going low only when output pulses from said oscillator means occur between synchronizing pulses from said two-state selector means and undergoing a low-to-high transition at the end of the output pulses from said oscillator means.

16. A signal-generating circuit as set forth in claim 14 in which said phase-error-detecting means includes responsive switching means having two inputs and an output, means for connecting the output of said phase responsive switching means in control relationship to the input of said two-state switching means, means for connecting one input of said switching means to the outputs of said oscillator means to sense the logical states thereof, means for connecting the other input of said switching means to the output of said OR circuit means to sense the compliment of the logical state thereof, said phase responsive switching means exerting control over said two-state only after the inputs of said switching means assume the same logical state.

17. A signal-generating circuit as set forth in claim 14 including synchronizing-pulse-suppressing means having first and second input means and output means, means for connecting the output of said synchronizing-pulse-suppressing means to an input of said OR circuit means, means for connecting the inputs of said synchronizing-pulse-suppressing means to respective outputs of said two-state switching means, said synchronizing-pulse-suppressing means being adapted to prevent changes in the state of the output of said OR circuit means when the outputs of said two-state switching means attain the same logical state.

18. A signal-generating circuit as set forth in claim 14 in which said two-state switching means comprises a flip-flop, said flip-flop being adapted to change states when the input thereof is energized and in which said phase-error-detecting means includes phase responsive switching means having two inputs and an output, means for connecting the output of said phase responsive switching means to the input of said flip-flop, means for connecting one input of said phase responsive switching means to the outputs of said oscillator means to sense the output pulses appearing thereat, means for connecting the other input of said phase responsive switching means to said two-state selector means to sense the synchronizing pulses appearing thereat, said phase responsive switching means energizing the input of said flip-flop at the termination of pulses appearing at the output of said oscillator means if the latter pulses are not produced during the times when synchronizing pulses are being sensed at said two-state selector means.

19. The signal-generating circuit as set forth in claim 15 including clearing means for bringing the operation of said synchronizing-pulse-generating means into phase with the operation of said oscillator means, said clearing means including clear-pulse-generating means having an input and an output, said clear-pulse-generating means being adapted to produce a pulse of predetermined duration at the output thereof when a high-to-low transition occurs at the input thereof, means for connecting the output of said clear-pulse-generating means in resetting relationship to said synchronczing-pulse-generating means, and logical state reversing means for connecting the input of said clear pulse generating means to the output of said NAND circuit means.

20. A signal-generating circuit as set forth in claim 10 in which said means for connecting said phase error detector means to the outputs of said oscillator means includes majority responsive switching means having a plurality of inputs and an output, means for connecting the inputs of said majority responsive switching means to the outputs of respective oscillator means and means for connecting the output of said majority responsive switching means to said phase error detecting means.

21. In a signal generating circuit, in combination, first and second synchronizing-pulse-generating means for establishing a succession of synchronizing pulses and respective outputs thereof, a plurality of oscillator means each having input means and output means, two-state selector means for connecting the output of said first synchronizing-pulse-generating means in frequency control relationship to the inputs of said oscillators means when said two-state selector means is in a first state and for connecting the output of said second synchronizing-pulse-generating means in frequency control relationship to the inputs of said oscillator means when said two-state selector means is in a second state, a plurality of output signal terminals, means for connecting the output means of said oscillator means to respective output signal terminals, phase responsive switching means, having output means and at least first and second input means, means for connecting one input of said phase responsive switching means to the output of said oscillator means to sense the pulse produced thereat, means for connecting said other input of said phase responsive switching means to the input means of said oscillator means to sense the synchronizing pulses applied thereto from the selected on said synchronizing-pulse-generating means, means for connecting the output of said phase responsive switching means in state controlling relationship to said two-state selector means, said phase responsive switching means initiating a change in the state of said two-state selector means when a noncoincident relationship exists between the pulses sensed by said phased responsive switching means.

22. In a pulse-generating circuit, in combination, first and second crystal oscillators, first and second counter circuits for generating respective synchronism control pulses, means for connecting said crystal oscillators in pulse generation control relationship to respective counter circuits, a plurality of oscillator means, OR circuit means having at least two inputs and an output, means for connecting the output of said OR circuit means in frequency control relationship to said oscillator means, first and second synchronizing pulse control means for controlling the states of respective inputs of said OR circuit means in accordance with synchronizing pulses from the respective counter, two-state switching means, means for connecting said two-state switching means in enabling relationship to said first synchonizing pulse control means when said two-state switching means is in the other of its two states, majority responsive switching means having a plurality of inputs and an output, means for connecting the inputs of said majority responsive switching means to respective oscillator means, phase-error-detecting means having at least first and second inputs and an output, means for connecting the output of said phase-error-detecting means in state controlling relationship to said two-state switching means, means for connecting the first input of said phase error detecting means to the output of said OR circuit means and means for connecting the other input of said phase-error-detecting means to the output of said majority responsive switching means.

23. In a pulse-generating circuit, in combination, first and second crystal oscillators, first and second counters for generating respective synchronizing pulses and respective counter correction pulses, means for connecting said crystal oscillators in pulse generation control relationship to respective counters, a plurality of oscillator means each having an input and an output, OR circuit means having at least two inputs and an output, means for connecting the output of said OR circuit means in frequency control relationship to the inputs of said oscillator means, first and second synchronizing pulse control means for controlling the logical states of respective inputs of said OR circuit means in accordance with synchronizing pulses from the respective counter, two-state switching means, means for connecting said two-state switching means in enabling relationship to said first synchronizing pulse control means when said two-state switching means is in a first of its two states, means for connecting said two-state switching means in enabling relationship to said second synchronizing pulse control means when said two-state switching means is in the other of its two states, majority responsive switching means having a plurality of inputs and an output, means for connecting the inputs of said majority responsive switching means to the outputs of respective oscillator means, phase responsive switching means having at least first and second inputs and output, means for connecting the output of said phase responsive switching means in state controlling relationship to said two-state switching means, means for connecting a first input of said phase-error-detecting means to the output of said majority responsive switching means, means for connecting the other input of said phase responsive switching means to the output of said OR circuit means, first and second clear-pulse-generating means having an input and an output, each said clear pulse generating means being adapted to produce a pulse of predetermined duration at the respective output thereof when the respective input thereof is energized, means for connecting the output of said phase responsive switching means in energizing relationship to the inputs of said clear-pulse-generating means, means for connection the outputs of said first and second clear-pulse-generating means in resetting relationship to said first and second counters, respectively first and second counter correction pulse control means, means for connecting said first counter correction pulse control means in energizing relationship to said second clear-pulse-generating means, means for connecting said second clear-pulse-generating means, means for connecting said first counter correction pulse control means to said first counter, means for connecting said second counter correction pulse control means to said second counter, means for connecting said two-state switch means when said two-state switching means is in a first of its two states and means for connecting said two-state switching means in enabling relationship to said second counter correction pulse control means when said two-state switching means is in the other of its two states.

UNITED STATES PATENT OFFICE
CERTIFICATE OF CORRECTION

Patent No. 3,599,111 Dated August 10, 1971

Inventor(s) Luther C. Butler, Jr., Thomas W. Grasmehr, and Robert S. Jamieson

It is certified that error appears in the above-identified patent and that said Letters Patent are hereby corrected as shown below:

In line 5 of the abstract change "responsive" to --respective--.

Column 1, line 74, change "inphase" to --in-phase--.

Column 2, line 3, change "he" to --the--.

Column 2, line 10, change "nature"to --natural--.

Column 3, line 26, change "provide" to --prove--.

Column 5, lines 5 and 6, erase "will be understood that the counter which is selected by flip-flop 12".

Column 6, line 22, after "separate" insert --but in phase synchronizing pulses SPA, SPB and SPC, these separate--.

Column 7, line 53, change "withing" to --within--.

Column 9, line 7, change "am" to --an--.

Claim 1, line 11, after "one" insert --of--.

Claim 4, line 3, after "output" insert --and at least two inputs, means for connecting the output--.

Claim 4, line 6, after "said" insert --phase responsive switching means in sensing relationship to said--.

)RM PO-1050 (10-69)

USCOMM-DC 60376-P69
☆ U S GOVERNMENT PRINTING OFFICE 1969 O—366-334

UNITED STATES PATENT OFFICE
CERTIFICATE OF CORRECTION

Patent No. 3,599,111 Dated August 10, 1971

PAGE - 2

Inventor(s) Luther C. Butler, Jr., Thomas W. Grasmehr, and Robert S. Jamieson

It is certified that error appears in the above-identified patent and that said Letters Patent are hereby corrected as shown below:

Claim 16, line 2, before "responsive" insert --phase--.

Claim 16, line 12, after "two-state" insert --switching means--.

Claim 21, line 22, change "on" to --one of--.

Claim 22, line 15, after "in" insert --a first of its two-states and means for connecting said two-state switching means in enabling relationship to second synchronizing pulse control means when said two-state switching means is in--.

Claim 23, line 25, after "and", second occurrence, insert -- an --.

Claim 23, line 32, after "means" insert --each--.

Claim 23, line 45, after "second" insert --counter correction pulse control means in energizing relationship to said first--.

Claim 23, line 50, before "when" insert --in enabling relationship to said first counter correction pulse control means--.

Signed and sealed this 4th day of April 1972.

(SEAL)
Attest:

EDWARD M.FLETCHER,JR.
Attesting Officer

ROBERT GOTTSCHALK
Commissioner of Patents